United States Patent [19]

Dailey et al.

[11] Patent Number: 5,036,551
[45] Date of Patent: Aug. 6, 1991

[54] ELASTOMERIC COMPOSITE FABRIC

[75] Inventors: Marlene M. Dailey, Nottingham; Edward J. Daniel, Landenberg, both of Pa.; Robert L. Henn, Wilmington, Del.

[73] Assignee: W. L. Gore & Associates, Inc., Newark, Del.

[21] Appl. No.: 481,309

[22] Filed: Feb. 16, 1990

[51] Int. Cl.⁵ .......................................... A41D 19/00
[52] U.S. Cl. .................................... 2/167; 2/168; 428/284; 428/297; 428/298; 428/315.5; 428/315.7; 428/315.9; 428/421; 428/422; 428/903
[58] Field of Search ............... 428/284, 315.5, 315.7, 428/315.4, 420, 421, 422, 903, 297, 298; 2/167, 168

[56] References Cited

U.S. PATENT DOCUMENTS

| | | | |
|---|---|---|---|
| 3,094,704 | 6/1963 | Abildgaard | 2/167 |
| 4,194,041 | 3/1980 | Gore et al. | 428/424 |
| 4,493,870 | 1/1985 | Vrouenraets et al. | 428/245 |
| 4,660,228 | 4/1987 | Ogawa et al. | 2/167 |
| 4,670,330 | 6/1987 | Ishiwata | 428/290 |
| 4,943,475 | 7/1990 | Baker et al. | 428/421 |
| 4,961,985 | 10/1980 | Henn et al. | 428/422 |

Primary Examiner—James J. Bell
Attorney, Agent, or Firm—Gary A. Samuels

[57] ABSTRACT

Elastomeric composite fabrics are described which have a layered construction and are made of a microporous polymeric membrane, a water vapor permeable polymer, and an elastomeric thermoplastic nonwoven material. The elastomeric composite fabrics provide barrier properties with water vapor permeability and find utility in articles of wearing apparel and other articles which conform about another object.

18 Claims, 4 Drawing Sheets

ELASTOMERIC COMPOSITE FABRIC

FIELD OF THE INVENTION

This invention is related to stretch fabrics. More particularly, the invention relates to elastomeric layered composite fabrics which provide barrier properties with moisture permeability and find utility in articles of wearing apparel and other articles which conform about another object.

BACKGROUND OF THE INVENTION

Clothing and associated wearing apparel for the body's extremities, such as gloves, hats, and socks, come under many constraints in their design, construction and use. Many end uses place unique requirements on the material utilized. Frequently, the material required does not exist, and as such there is an ever ongoing effort to develop new materials to meet these new, and/or more difficult requirements. To illustrate this situation, a particular problem which has confronted those in the art is the provision of a functional glove, with comfort, for clean room environments.

In the electronics and pharmaceutical industries requirements for contamination control in clean room environments have become more and more demanding. Contamination can result from air-borne particles of submicron size or from material transfer from one surface to another. One source of contamination is from the clean room personnel and their associated clothing. Therefore, on-going efforts exist in developing clothing articles, including gloves, that enhance contamination control. Contamination control is provided by a glove when:

1) The glove prevents particles, or other undesired materials from the hand, to pass from the hand to the outside of the glove.
2) The glove can be rendered free of contamination before use by the wearer.
3) The glove does not, during use, abrade or otherwise break down, and subsequently become a source of contamination.

Workers in the clean room perform numerous operations while wearing gloves. Throughout the day, they must be able to perform these operations reliably and with minimum hinderance by their gloves. They must be able to handle objects, and move their hands and fingers, both freely and delicately. Therefore, desirable glove characteristics, from the wearer's consideration are:

1) Form-fitting—A glove should be form-fitting, and contoured to the shape of the hand, neither having an undesirable excess and/or a bunching of the material, nor intense tightening upon the hand.
2) Touch—Touch is defined as the array of sensations arising from the pressure sensitivity of the skin. Therefore, desirably the glove should not impair touch or tactility (i.e. the sense of touch) while picking up and handling objects.
3) Dexterity—Dexterity is the skill in using one's hands. A clean room glove desirably, therefore, allows for great dexterity.
4) Comfort—The glove should be comfortable during use, it is undesirable to have either an accumulation of sweat inside the glove or have the hand in intimate contact with something that feels "plastic or rubbery".

Thus taken collectively, the desired clean room glove:
1) provides contamination control, while being both
2) functional (i.e.—form-fitting, with good touch and dexterity characterisitcs), and
3) comfortable.

Currently, numerous different glove technologies are found for use in clean room gloves, however, no one technology exhibits all of the desired characteristics recited above.

Elastomeric resin gloves and their functionally beneficial characteristics have been taught in the art for some time. For instance, U.S. Pat. No. 3,094,704 to Abildgaard, teaches the control of thickness and resilience or elastomeric memory of the material used. Commercially, elastomeric resin gloves, such as those referred to as "latex gloves", are used in clean rooms. These gloves exhibit good functional characteristics and initial contamination control. They are, however, deficient in comfort characteristics. The sweat accumulation during use and the intimate film contact against the skin make them uncomfortable and thus undesirable for the wearer. Furthermore, in use these gloves shed submicron particles from the material surface and thus are a source of contamination.

Plastic and plasticized polymeric material, such as polyvinyl chloride ("vinyl") gloves, are also commonly used in clean rooms. Vinyl gloves suffer from the same comfort limitation found with latex gloves. Furthermore, due to their limited elastomeric characteristics, vinyl gloves must be oversized to fit on the wearer's hands. This oversizing not only is dificient in fit but compromises touch as well. Oversizing the glove also makes closure around the wrist more difficult in practice, thereby, increasing the risk of contamination. These gloves too, are known to shed submicron particles from the material surface and thus are a primary source of contamination.

As an improvement over the above, U.S. Pat. No. 4,670,330 to Seihi, provides for gloves consisting of a thin elastic film of hydrophilic polyurethane resin. Due to their moisture permeability, they exhibit less accumulation of sweat in the glove and are, therefore, more comfortable to the wearer. The hydrophilicity, and in turn, the moisture permeability, of this glove is limited in practice in that with increasing hydrophilicity the film swells excessively with water causing it to become unacceptably weak and eliminating any previous fit. Practically, this limits the comfort range of this glove. U.S. Pat. No. 4,783,857 to Suzuki, is directed to improving upon this via a prescribed polyoxyethylene content incorporated into the polyether segment of their polyurethane. Here again, the compromise between comfort and satisfactory glove physical properties is seen. In addition, both of these technologies do not overcome the undesirable feature of the hand in intimate contact with the film producing an uncomfortable feeling to the wearer. Furthermore, at least in the commercial gloves available according to the teachings of Seihi, the high modulus of elasticity of the material requires that the gloves be formed in a size larger than the hand. As such the gloves do not fit well on wearing, with concomitant loss of touch and more difficult wrist closure.

Fibrous sheet materials such as woven fabrics, knitted goods, nonwoven fabrics and the like, provide suitable comfort to the wearer but find limited use in contamination control. Particles of a submicron size, and oils from the hand, find pathways through the material.

An improvement on the sewn construction of most fibrous material gloves is seen in U.S. Pat. No. 4,660,228 to Ogawa, where a polyurethane nonwoven is heat sealed to form the glove. While this glove has superior fit to many sewn gloves it still suffers by having ready pathways for migration of contaminants.

Liquid watertight, but water vapor-permeable, membrane material exists which has been used increasingly in recent years for the production of articles of clothing. In practice, these membranes are most frequently in laminate form. Due to their water vapor-permeability they result in pleasant wearing properties. Suitable membrane material is made, for example, of expanded microporous polytetrafluoroethylene (PTFE), or even of a layered membrane of hydrophilic polyurethane imbibed into the surface of hydrophobic expanded microporous PTFE as taught in U.S. Pat. No. 4,194,041. Expanded PTFE membrane material has also been used for producing articles of clothing for use in contamination control intended for application in the clean room environment.

Glove insert technology of liquid watertight but water vapor-permeable material is known. Glove inserts are placed between an outer layer and a liner layer of the final glove construction. Inserts appear in the marketplace as heat bonded sheets of various materials such as hydrophilic polyurethane, expanded PTFE membrane, microporous polyurethane, or of copolyether ester film laminated to a knit (U.S. Pat. No. 4,493,870 to Vrouenraets). These inserts suffer from being over sized and as such do not fit the hand well in wearing. This results in loss of touch and dexterity.

Elastomeric composite fabrics of various descriptions exist in the art. A liquid waterproof, water vapor permeable elastomeric fabric is taught in the teachings of U.S. Pat. No. 4,453,511 to Worden. Specifically a membrane of continuous hydrophilic polyurethane and hydrophobic microporous expanded PTFE is laminated to a knit containing a spandex fiber. Clean room gloves of laminate of similar material have also been available commercially, in which the PTFE surface is oriented outward. The seams are sealed with a tape to eliminate the needle holes being a pathway for contamination migration. As seen in Comparative Example 1 hereinbelow, these gloves suffer functionally from a loss of touch and dexterity, due to the laminate thickness and seam construction.

Elastomeric composite fabrics comprising at least one layer of elastomeric nonwoven fabric are known. Typical of the composite elastomeric fabrics are those taught in U.S. Pat. No. 4,692,368 to Taylor, U.S. Pat. No. 4,657,802 to Morman and U.S. Pat. No. 4,655,760 to Morman. It should be noted that all of these elastomeric composite fabrics result in increased bulk over the base elastomeric nonwoven employed. Frequently this comes about by the "gathered" or "wrinkled" non-elastomeric material which puckers between sites bonded to the elastomeric nonwoven. Additionally, these materials suffer the same limitations cited above for fibrous materials employed in a glove configuration.

Elastomeric composite fabrics of elastomeric films on elastomeric nonwovens are known in the art and taught for instance in U.S. Pat. No. 4,660,228 to Ogawa, wherein an elastomeric polyurethane nonwoven taught specifically therein is combined with the modified polyurethane film according to the teachings of U.S. Pat. No. 4,539,255 to Sato. This technology represents an improvement over the gloves of hydrophilic resin alone, but suffers from the same compromise of water vapor permeability (and thus comfort) with satisfactory physical properties.

Unfortunately, the known elastomeric composite fabrics of the art have been lacking in one or more of the characteristics cited above as necessary for a satisfactory clean room glove material.

SUMMARY OF THE INVENTION

The invention herein is an elastomeric composite fabric which is substantially planar and which comprises in a layered arrangement:
(i) a microporous polymeric membrane
(ii) a water vapor-permeable polymer and
(iii) an elastomeric thermoplastic fibrous nonwoven web in which the fibers are elastomeric and are less than 50 micron in diameter,
said polymer (ii) being continuous and being in contact with membrane (i) and substrate (iii),
said composite fabric exhibiting an elastic modulus in at least one direction being less than about 15 pli, and said fabric having an overall thickness less than about 15 mils, and having a force to flex of less than 35 gm. in any direction
said composite fabric being liquid water-impermeable and being water vapor-permeable to the extent of having a water vapor transmission rate of at least 5000 gm.m$^2$/24 hrs.

Additionally, the invention herein also provides a form fitting article which comprises two superimposed layers of the elastomeric composite fabric, each defined above, said two layers being joined together along the periphery thereof to form a configuration corresponding to the contour of a desired article, leaving an unjoined opening portion.

Preferably, the composite fabrics are arranged so that the microporous polymeric membrane of each layer is on the outside surface, and the nonwoven web is the inner surface. However, the arrangement can be reversed with the membrane on the inside and the nonwoven web on the outside.

Preferably, the article is substantially non-air permeable and water tight.

Additionally, the invention herein provides the above two layers of elastomeric composite fabric in the form of a form-fitting glove wherein said two composite fabrics are joined together along the periphery thereof to form a configuration corresponding to the contour of a hand leaving the wrist portion open.

The elastomeric fabric of this invention when formed into a glove exhibits all the characteristics desired in a clean room glove. It provides contamination control, functionality, and comfort. The fabric provides a barrier to contamination while providing water vapor permeability, and readily forms functional three dimensional articles from the two dimensional elastomeric fabric of this invention.

The elastomeric fabrics have tailored elastomeric characteristics, and provide articles of clothing which are form-fittng with contamination control and comfort to the user.

By "substantially planar" is meant that the fabric is substantially non-gathered.

By "continuous" is meant an essentially unbroken layer as seen in photomicrographs of a cross section of the composite fabric.

Elastic fiber means a fiber which at room temperature, i.e. 22°-27° C., can be stretched in excess of twice its original length (2x), for example from 1 inch to at least 2 inches, and upon release of the stretching force will return to approximately its orginal length.

Elastic material, web or composite means that the article has an elastic limit greater than 10% in any direction.

By "nonwoven web" is meant a material formed without use of a weaving process but which has a structure of interlocking fibers in a random manner. Nonwoven webs can be formed by meltblowing, spunbonding, carding or the like. Generally, they will have a basis weight of from about 1 gram/square meter to about 300 grams/square meter, and preferably, 5–150 gm./square meter.

BRIEF DESCRIPTION OF THE DRAWINGS

FIG. 2 is a photomicrograph of a fabric depicted in FIG. 1.

DETAILED DESCRIPTION OF THE INVENTION

The elastomeric composite fabric of this invention comprises a layered construction of a microporous polymeric membrane, a continuous layer of a moisture (i.e., water vapor) permeable polymer, and an elastomeric thermoplastic nonwoven material. Preferred embodiments of the elastomeric composite fabrics of this invention involve composites made of only these three materials of construction, but it is to be understood that additional materials may be involved in the construction of elastomeric composite fabrics of this invention.

There are two preferred embodiments of this invention, one involves use of a laminate technology and the other involves use of a coated product technology.

Figure 1:
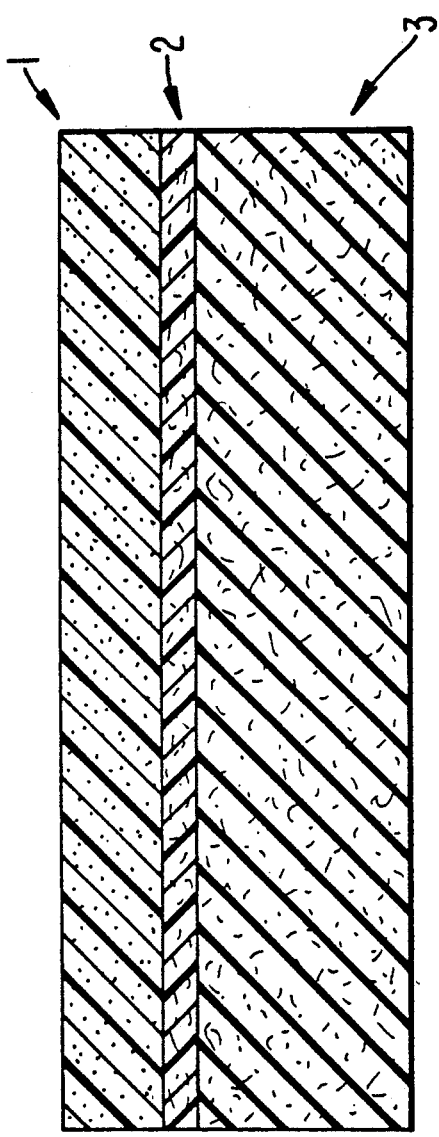
FIG. 1 is a schematic view of a three layered laminated elastomeric composite fabric of the invention.

The laminated composite fabric is illustrated schematically in FIG. 1 while FIG. 2 shows a photomicrograph of the same. In FIG. 1, 1 is the microporous polymeric membrane, 2 the continuous moisture permeable polymer, and 3 the elastomeric nonwoven web material. As the schematic illustrates these are oriented principally in individual layers. It should be understood, however, that the moisture permeable polymer 2, penetrates partially into the micropores of layer 1.

Figure 3:
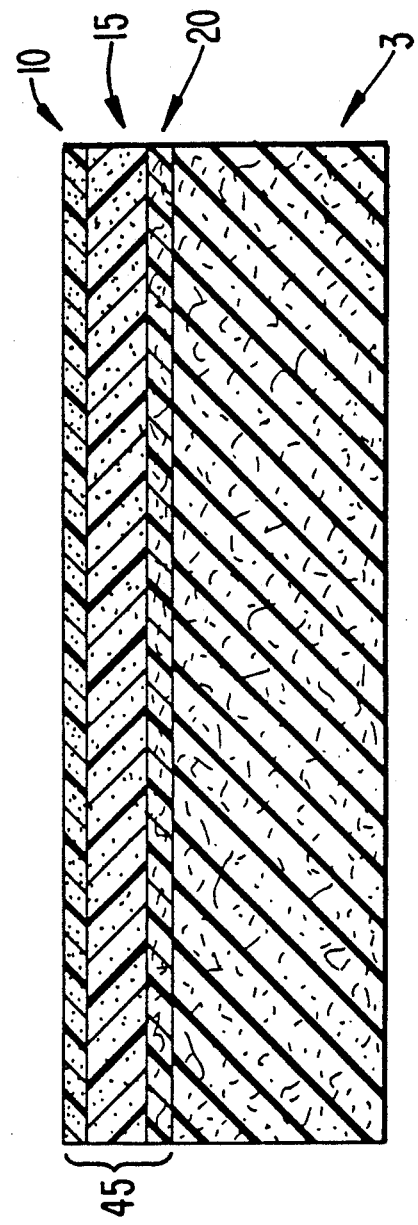
FIG. 3 is a schematic view of a coated elastomeric composite fabric of the invention.
Figure 4:
FIG. 4 is a photomicrograph of a fabric depicted in FIG. 3.
Figure 4:
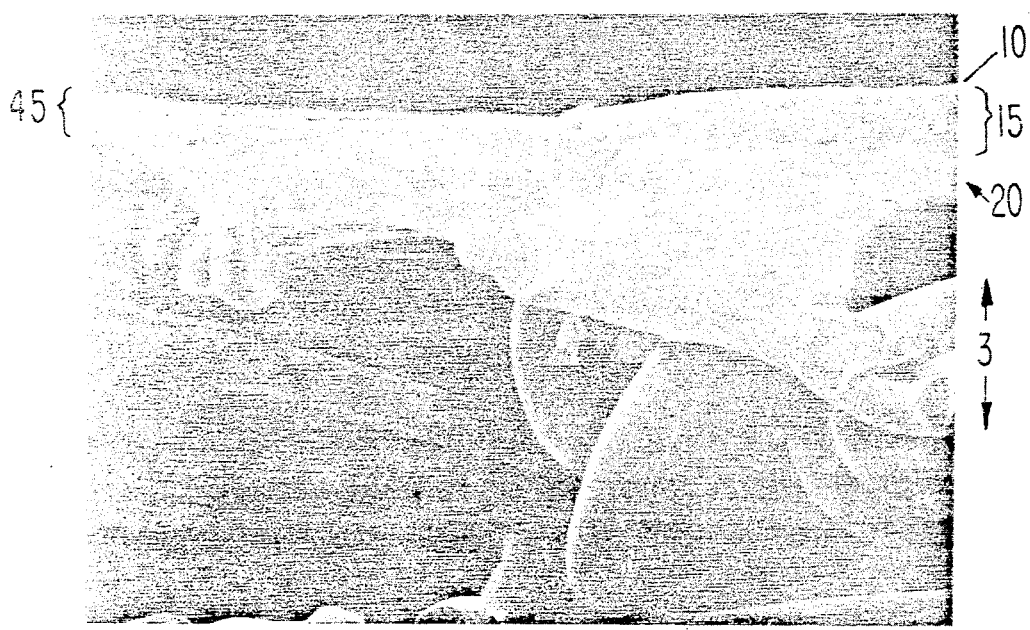

The coated composite fabric is illustrated schematically in FIG. 3 while FIG. 4 shows a photomicrograph of the same. In FIG. 3, the coating 45 is the sum combination of the microporous polymeric membrane and the moisture permeable polymer. In this embodiment the moisture permeable polymer is found principally within the microporous polymeric membrane 15, with two distinct faces of the coating layer provided by the materials of the coating. The exposed face 10 of the coating is predominately that of the microporous polymeric membrane, and the inner face 20 of the coating, is that of the water vapor-permeable polymer. While the coated product embodiment consists of three materials, it is characterized as two layers, that of the coating 45 and the elastomeric nonwoven material 3.

By proper selection of the materials and assembly techniques, the composite fabric of this invention yields several worthwhile and surprising results.

Unlike many composites, wherein the materials of construction are assembled essentially in layers, the composites of this invention are extremely soft, thin and flexible. The composite fabric is generally relatively thin in cross-section, generally less than 15 mils, preferably less than 10 mils, most preferably between 1 and 10 mils, and surprisingly the composite fabric of this invention frequently exhibits an overall thickness less than the sum of the component parts and in some of the more preferred embodiments actually less than the thickness of the elastomeric nonwoven, which may be due to decreased loft in the composite as opposed to the loft of the components. If what is desired is a soft flexible material it is greatly advantageous to keep the thickness to a minimum. According to deflection theory, the force required to bend a material goes up by the cube of the thickness of the material. Thus to increase a material in thickness from 10 mils to 20 mils, holding all else constant, the force required to flex that material would increase by almost an order of magnitude. It has been found that this thickness influence with the elastomeric composite fabric of this invention is most significant if the overall thickness starts getting significantly higher than 0.010 inches.

Of great utility is the fact that the composite fabrics of this invention demonstrate a broad range of elastomeric characteristics that can be incorporated into the final composite, at times actually considerably different than any of the elastomeric features demonstrated by the materials of construction. The fabrics of this invention demonstrate particularly soft elastomeric characteristics in that they require a low amount of force to elongate them in at least one direction. This is defined by the modulus of elasticity. The fabrics of this invention demonstrate a modulus of elasticity of less than 15 p.l.i. in at least one direction. It is worthwhile to note that in considering the physical properties of this composite fabric such as softness and flexibility, and its elastomeric features, it appears that the freedom of movement is inherent in the entire composite and not explained strictly by the built in geometry by which it is assembled nor strictly explained by any one of the materials of construction.

A useful characteristic of the preferred embodiments of the elastomeric composite fabric of this invention is that they exhibit relatively smooth surfaces in their relaxed state. This comes about because the individual materials of the elastomeric composite fabric herein are not principally in a gathered state at rest, i.e. they are substantially planar. The elastomeric nonwoven web side of the elastomeric composite fabric exhibits a fibrous structure, but no evidence of folding or gathering. As such this face is described as being macroscopically smooth, albeit microscopically this smoothness is disrupted by the fibers of the nonwoven. More noteworthy is the opposing face provided by the microporous membrane. Here again this face does not exhibit gathering on a macroscopic scale as seen frequently in the prior art. On a microscopic scale the surface of the microporous membrane may be described as exhibiting an undulated, reticulated, or rippled appearance, i.e. a micropuckered appearance.

The results of this planar arrangement of the materials, as opposed to a gathered arrangement, are direct when considering the thickness of the elastomeric composite fabric. Because the resultant elastomeric composite fabric is thinner, the touch and flexibility characteristics are superior to thicker materials. A surprising dramatic improvement is also seen in the flexibility of the elastomeric composite fabric. No geometric structures that resist bending, such as tubes, are generated as is found to be frequently the case in materials with a large gathered appearance.

Having a continuous water vapor-permeable but liquid water impermeable polymer layer, the elastomeric composite fabric provides a barrier to particle migration and other contaminants. This provides superior contamination protection over material that relies on filtration phenomena to keep out (or in) contaminants. The continuity of this layer can be demonstrated by the fact that the elastomeric composite fabric has substantially no air permeability. This property is imparted by the continuity of the polymer layer, because the nonwoven substrate and the microporous membrane exhibit air flow by their nature.

The elastomeric composite fabrics herein also further have the beneficial functional characteristic of being water vapor-permeable. The fabrics have an WVTR (Water Vapor Transmission Rate) of at least 5,000, preferably greater than 6,000, and most preferably greater than 8,000 gms.m$^2$/24 hrs.

The fabrics also have good force to flex values such values being less than 35 gm. in any direction, preferably less then 20 gm. in at least one direction and, most preferably, less than 20 gm. in any direction.

Additional characteristics of this elastomeric composite fabric are best understood when the fabric is converted into an article such as a glove for clean room use.

One embodiment for manufacturing the gloves with the fabrics of this invention is as follows. Two layers of the composite fabric are positioned such that the microporous polymeric membrane layer is the outer layer and the elastomeric nonwoven web layer is the inner layer, and thus in physical contact with the other layer of nonwoven web. These sheets of material are then subjected to simultaneous cutting and heat sealing by means of appropriate dies known in the art. The heat sealing of the two sheets is accomplished along the periphery that defines the contours of a hand, leaving the wrist portion unsealed. The cutting is accomplished outside or along this heat seal bond line and in addition includes the wrist portion. What is obtained is a two-dimensional elastomeric glove into which the hand may be inserted via the open wrist portion. Due to the features of the elastomeric composite fabric herein, and if the die pattern has been appropriately designed and sized, the glove contours to the individual's hand as it is pulled on, yielding a three-dimensional form fitting glove.

The bond line of the gloves appears to be accomplished primarily by the thermoplastic characteristic of the thermoplastic elastomeric nonwoven, which when bonded properly create a continuous thin elastomeric seam. The seam is achieved without sewing, so is not only easier to manufacture but produces a bond line that has the same barrier characteristics of the elastomeric composite fabric. As such the gloves of these materials also are liquid water tight and are substantially air-impermeable. This means there is an exceptionally high contamination protection provided by the gloves made of the elastomeric composite fabric. The bond line is found to exhibit much of the desired characteristics of the base elastomeric composite fabric in that it is soft, flexible, elastomeric and conforms to the wearer's hand. Furthermore, the bond is of sufficient stength that it can be maintained small so as to not impair any of the touch of the glove particularly at the finger tips.

As the gloves are formed of the elastomeric composite fabric of this invention and can be tailored in their elastomeric features, numerous advantages can be engineered into the gloves. For instance, the glove can be made of an elastomeric composite fabric that exhibits a low modulus of elasticity in one direction that can be oriented cross-wise across the glove, while in the lengthwise direction the modulus of elasticity can be made to be higher such that the glove can more readily be pulled over the hand. The form fitting characteristics are primarily provided by the material conforming in the width direction and little distortion is seen in the longitudinal direction. This ability to create isotropic features in the elastomeric characteristics of the elastomeric composite fabric is one of the values of the elastomeric composite fabric herein. Combined with glove design and fabric orientation, this ability allows for considerable latitude in designing gloves for various applications.

Further, as the gloves are constructed from the elastomeric composite fabric herein they are soft and flexible, and have a low modulus of elasticity, they allow for good dexterity on behalf of the user. The thinness has also provided for exceptional touch characteristics for the user. Surprisingly the touch characteristics are so significantly improved over some of the prior art that the user has such exceptional feel that the slip characteristics of some of the microporous membranes become less important than in prior art.

Furthermore, the gloves are comfortable to the user. The fact that a textile type of surface is presented to the hand by the nonwoven, none of the undesirable "plastic" feel of film-type materials is incurred. Furthermore, the microclimate around the wearer's hand is maintained comfortable by the high water vapor permeability of the elastomeric composite fabric.

Because gloves of the elastomeric composite fabric herein exhibit exceptional contamination control, are very functional (i.e., form-fitting, with good touch and dexterity characteristics) and comfortable, they are particular useful in such applications as in a clean room. It is understood that these characteristics in a glove, other wearing apparel, or other conformable articles are of use to various degrees and in different combinations as defined by the end-use.

Additionally, by reversing the two layers of composite in a glove, i.e., so that the microporous polymeric membrane is on the inside of both portions of the glove, the glove is useful as a burn mitten, i.e., a protective glove for burned hands or fingers. Alternatively, the elastomeric composite fabric itself can be used as a burn compress.

The microporous polymeric membrane used in this invention is a microporous polymer having a microscopic structure of open, interconnecting micro voids. It exhibits air permeability and as such imparts, or does not impair, water vapor permeability. The microporous membrane in the laminate embodiment herein is typically of a thickness of 25 μm to 127 μm, most preferably of the order of 76 μm. In the coated product embodiment it is of a thickness of 5 μm to 25 μm, most preferably of the order of about 13 μm.

When the microporous membrane is the outer surface such as when the elastomeric composite fabric is made into an article such as a clean room glove, the surface of the membrane is not a source of contamination.

Furthermore, the microporous polymeric membranes useful herein are soft and flexible, either by virtue of their geometry or their chemistry or both. The useful polymers of the microporous membrane materials surprisingly include plastic polymers as well as elastomeric polymers. Examples of suitable polymers include polytetrafluoroethylene, polypropylene, polyethylene, polyesters, polyamides, polyacrylates, polyurethanes, copolyether esters, copolyether amides and the like. Surprisingly, the preferred polymers are plastic polymers.

The preferred microporous polymeric membrane material is expanded, microporous polytetrafluoroethylene (PTFE). These materials are characterized by a multiplicity of open, interconnecting microscopic voids, high void volume, high strength, soft, flexible, stable chemical properties, high water vapor transfer, and a surface that exhibits good contamination control characteristics. U.S. Pat. Nos. 3,953,566 and 4,187,390 describe the preparation of such microporous expanded polytetrafluoroethylene membranes and are incorporated herein by reference.

It has been found that in part the elastomeric composite fabric's direction of elasticity can be controlled to a large degree by the ability to select expanded microporous PTFE membranes of different isotropic character. For example, if the membrane shows a tendency to be deformed in one direction easily, but not in the other, the resulting elastomeric composite fabric will show good elastomeric characteristics, with a low modulus of elasticity in the same direction, while the perpendicular direction will resist elongation. Similarly, if an elastomeric composite fabric being anisotropic in character is desired the expanded PTFE employed should exhibit a balance of physical properties.

The continuous water vapor permeable polymer layer is an hydrophilic polymer having some elastomeric characteristics. The hydrophilic layer selectively transports water by diffusion, but does not support pressure driven liquid or air flow. Therefore, moisture i.e., water vapor, is transported but the continuous layer of the polymer precludes the passage of such things as air-borne particles, microorganisms, oils, or other contaminants. This characteristic imparts to the elastomeric composite fabric, and inturn to articles such as a glove, good contamination control characteristics by functioning as a barrier to contaminants of all sizes. Furthermore the water vapor transmitting characteristics of the material allow for comfort characteristics to the wearer.

The continuous water vapor permeable polymer layer is typically of a thickness of between 5 $\mu$m to 38 $\|$ m, preferably between about 10 $\mu$m to 20 $\mu$m inches. This thickness has been found to be a good practical balance to yield satisfactory durability, continuity, and rate of water vapor transmission.

The continuous, water vapor-permeable polymers most useful herein, although not limited to, are those of either the polyurethane famly or the copolyether ester family. Suitable copolyether ester hydrophilic compositions may be found in the teachngs of U.S. Pat. No. 4,493,870 to Vrouenraets and U.S. Pat. No. 4,725,481 to Ostapachenko. Suitable polyurethanes may be found by way of example in the teachings of U.S. Pat. No. 4,194,041 to Gore and in PCT publication 90/00180 to Sakhpara. Typically these materials comprise a composition having a high concentration of oxyethylene units, to impart hydrophilicity, typically greater than 45% by weight of the base polymer, preferably greater than 60%, most preferably greater than 70%.

Because the continuous water vapor permeable layer is not directly exposed, but is protected by the microporous membrane and the elastomeric nonwoven, in the elastomeric composite fabric of this invention, the hydrophilicity does not need to be compromised as it has in many prior art fabrics. Preferably materials are selected so that the water vapor permeability of each is at its maximum. As such the continuous permeable polymer layer can frequently be found to be the limiting link in the water vapor permeability of the fabric. Part of the inventiveness herein is the ability to be able to maximize the water vapor permeability without tradeoffs to the final elastomeric composite fabric's contamination control, thickness, and flexibility.

A preferred class of continuous, water vapor permeable polymers are polyurethanes, especially those which comprise the reaction product of:

(i) a polyol (A) of primarily oxyethylene units, having a molecular weight of from about 600 to about 3500 and having a functionality of at least 2;

(ii) a isocyanate (B) having a functionality of at least 2, and (iii) a low molecular weight bifunctional chain extender (C) having a molecular weight in range lower than about 500 and having a functionality of at least 2, wherein the reactants are employed in such proportions so as to satisfy the following equations:

$$\frac{Eq_{NCO}}{Eq_{OH} + Eq_{CE}} \geqq 1.1$$

$$Eq_{OH} \geqq Eq_{CE}$$

$$Eq_{CE} > 0$$

wherein $Eq_{NCO}$ is the molar equivalent of the isocyanate species employed and $Eq_{OH}$ and $Eq_{CE}$ denote the respective molar equivalents of the polyol and chain extender employed.

Within this class, more preferred class is where the isocyanate is a polyisocyanate (B).

The most preferred polyurethanes useful herein are those where the polyol is a poly(oxyethylene) glycol and the isocyanate is a diisocyanate.

These polyurethanes are described in greater detail in U.S. Pat. No. 4,532,316 to Henn.

The elastomeric nonwoven webs useful herein are fibrous nonwoven webs which are soft, elastomeric and of pleasing feel. They are of low bulk and thin, preferably less than 15 mils in thickness. The nonwovens used herein are air permeable.

The more preferred elastomeric nonwovens are characterized by hving numerous fibers of small diameter. The diameters are nominally less than 50 microns, preferably less than 20 microns and usually are greater than 0.1 micron. This appears to provide better softness, and physical properties of the nonwoven. The continuous filament characteristic also yields a nonwoven which is low linting, a desirable feature for contamination control.

Further, it appears that this generates a multiplicity of fibers against the hand when the elastomeric composite fabric is in glove form. This situation appears to improve the touch characteristics of the fabric. Additionally, with proper nonwoven selection, as these fibers are against the hand the undesirable characteristic feel of a film against the hand is not present. Along with the water vapor permeability feature of the elastomeric composite fabric, the fabric is found to yield pleasing comfort.

Elastomeric nonwovens can be made of block copolymers such as polyurethanes, copolyether esters, ethylene vinyl acetate, copoly(styrene/ethylene-butylene) and the like.

A preferred thermoplastic elastomeric nonwoven web is composed of a coherent nonwoven matrix of elastic fiber of a polyetherester. The polyetherester preferably has the formula

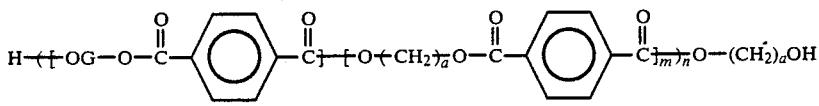

where
"G" is selected from the group including poly(oxyethylene)-alpha, omega-diol poly(oxpropylene)-alpha, omege-diol or poly(oxytetramethylene)-alpha, omege-diol and "m", "n" and "a" are positive integers. For example, "a" may be 2, 4 or 6.

These webs are described in U.S. Pat. No. 4,707,398 to Boggs.

Another preferred thermoplastic elastomeric nonwoven web is composed of a coherent nonwoven matrix of elastic fiber of a polyurethane where the elastic fibers randomly overlap and are bonded together at cross-contact points. Such webs have elongations at break of 300-800% and an elastic recovery percentage of 100% elongation of at least 85%, as more fully described in U.S. Pat. No. 4,660,228 at column 5, lines 28-45, and column 3, lines 45-60.

In the laminate embodiment of the invention, the hydrophilic polyurethane functions, in addition to the functions discussed above, as an adhesive that bonds the microporous membrane and the elastomeric nonwoven. The hydrophilic polyurethane in the form of its liquid phase is applied to one side of the microporous polymeric membrane in a controlled amount so as to form a continuous layer on the membrane and to partially infiltrate the micropores on the face of the membrane. The membrane is then combined with the elastomeric nonwoven. The polyurethane is subsequently caused to solidify and/or cure generating a firm bond between all layers of the composite.

Figure 5:
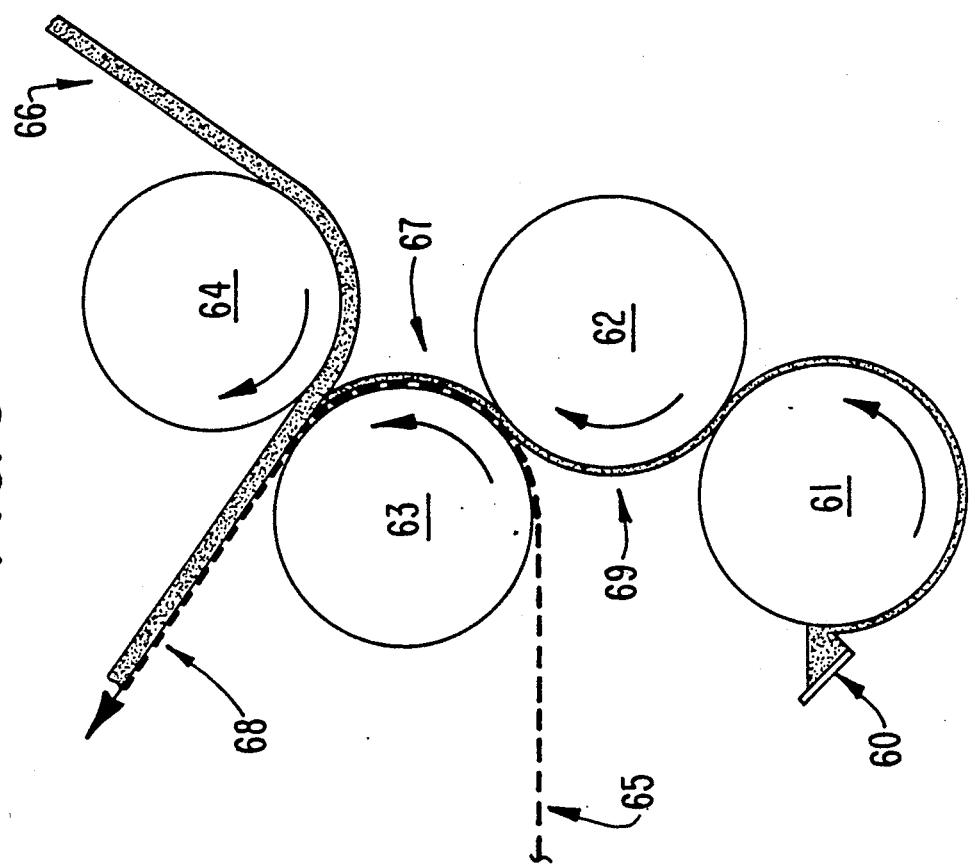
FIG. 5 depicts a lamination procedure used to make composite fabrics of the invention.

The laminate embodiment of the composite fabric, shown in FIG. 1 and 2, can be prepared by a lamination process as depicted but not limited to the following description illustrated in FIG. 5. A four roll stack is utilized. Metered control of molten hydrophilic polyurethane material is provided for by a gravure roll, 61, and doctor blade/feed reservoir 60. The polyurethane 69 is applied in a controlled amount to the continuously moving microporous membrane 65, in the nip between two rotating rolls, 62 and 63; one such rotating roll, 62. carrying a controlled amount of the polyurethane and the other roll, 63, providing support so as to force the polyurethane partially into the porous structure of the microporous membrane 65. The coated membrane 67 is combined with the elastomeric nonwoven 66 in the nip between two rotating rolls 63 and 64. resulting in the laminate embodiment of the elastomeric composite fabric of this invention. The elastomeric nonwoven 66, may or may not be under tension (i.e., stretched) when combined with the coated membrane 67.

To prepare the coated product embodiment of the elastomeric composite fabric of the invention, the coating is achieved by the combination of the microporous membrane and the hydrophilic polyurethane. As taught in U.K. publication 2204270, the microporous membrane of a thickness less than 0.001 inches functions as a scaffold layer controlling the geometry of the resultant coating (i.e. the scaffold and polyurethane combination). The coating is formed by substantially filling the micropores with the polyurethane in its liquid phase. Care is exercised to not fill the microporous voids on one face. The nonwoven is combined with the coating and the polyurethane subsequently caused to solidify and/or cure, forming a firm bond between the coating and the nonwoven.

Figure 6:
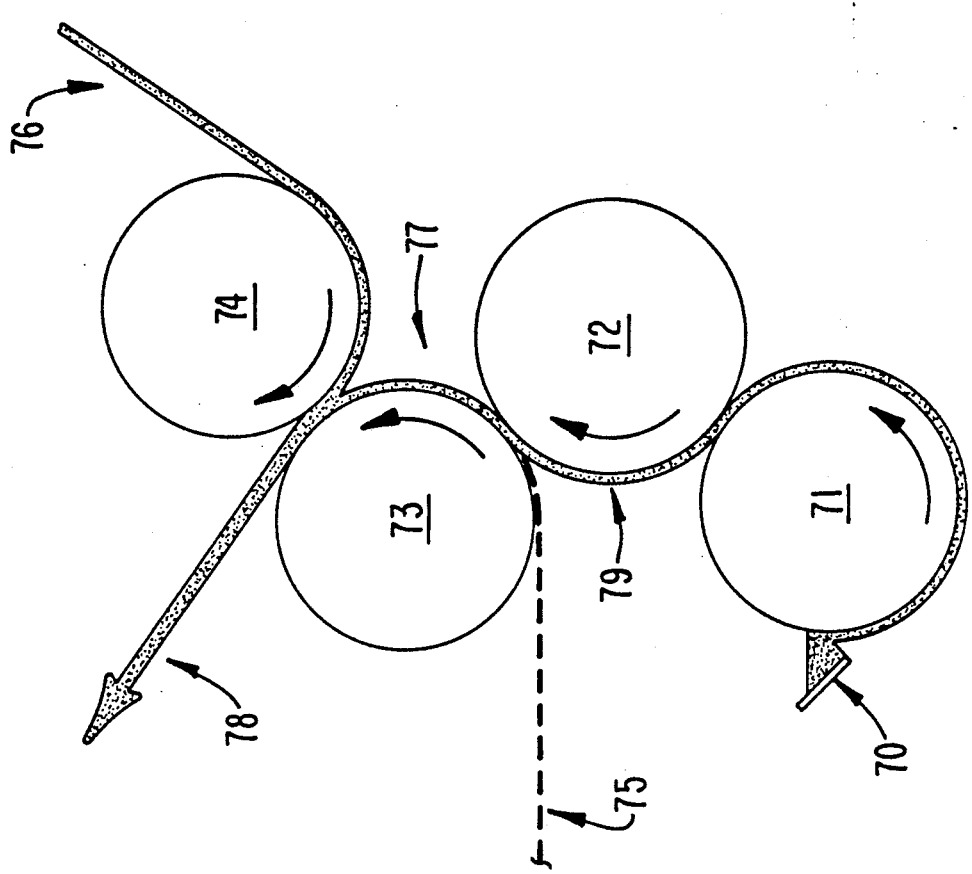
FIG. 6 depicts a coating procedure used to make composite fabrics of the invention.

The coated embodiment shown in FIG. 3 can be prepared by a coating process as depicted, but not limited to the following description illustrated in FIG. 6. A four roll stack is utilized. Metered control of molten hydrophilic polyurethane material is provided for by a gravure roll, 71, and doctor blade/feed reservoir 70. The polyurethane 79 is applied in a controlled amount to the continuously moving scaffold microporous membrane 75, in the nip between two rotating rolls, 72 and 73; one such rotating roll 72 carrying a controlled amount of the polyurethane and the other roll 73 providing support so as to force the polyurethane into the scaffold 75. The material selection and process are controlled such that the coating 77, which is the combination of the polyurethane 79 and scaffold 75, exhibits a unitary material with two distinct faces, one of microporous membrane and on the opposing face, polyurethane. The microporous membrane in this process is best understood as a process aid in defining the resultant coating geometry, both in the processing and in the final product. The coating 77, is combined with the elastomeric nonwoven 76 in the nip between two rotating rolls 73 and 74. resulting in the coated elastomeric nonwoven embodiment of the elastomeric composite fabric of this invention. The elastomeric nonwoven 76, may or may not be under tension (i.e. stretched) when coated.

The coating is attached to the substrate in an unique way. The coating and the substrate attach only at elevated specific points. This is contrasted against what is normally seen in the prior coating art, wherein the coatings in general seems to follow the contour of the substrate and/or fill in the voids and valleys in the substrate. In other words, the coating herein on a microscopic scale is seen to span between the points of contact of the substrate rather than follow the contours of the surface.

It is believed that it is this phenomena that contributes to many of the desirable characteristics of the coated elastomeric composite fabric. The coating geometry allows for good flexibility and dexterity, and in addition does not lock in the structure of the elastomeric nonwoven so as to destroy its freedom of motion and subsequently losing its elastomeric characteristics. Furthermore, it is believed that it is the combination of scaffold and polyurethane that allows for such a thin coating layer to be so continuous. It is this continuity that is essential in providing the desired functional barrier properties and the thinness that allows such high rates of water vapor transfer.

It will be understood by those skilled in the art that the amount of elasticity of the elastomeric composite fabrics herein is not only controlled by the materials selection but in part by the processing conditions., most importantly the amount of stretch in the layers when combined and/or their subsequent opportunity to relax or be maintained in the stretched condition. Surprisingly, this frequently is not as influential as might otherwise be expected and as such some amount of experimentation must be employed to determine the influence of both materials selection and process conditions. Being thus able to tailor the elastomeric features of the elastomeric composite fabric herein both as concerns direction and degree is a useful feature.

TEST DESCRITPIONS

WATER VAPOR TRANSMISSION RATE (WTVR)

A description of the test employed to measure water vapor transmission rate (WVTR) is given below. The procedure has been found to be suitable for testing films, coatings, and coated products.

In the procedure, approximately 70 ml. of a solution consisting of 35 parts by weight of sodium chloride and 15 parts by weight of distilled water was placed into a 133 ml. polypropylene cup, having an inside diameter of 6.5 cm. at its mouth. An expanded polytetrafluoroethylene (PTFE) membrane having a WVTR of approximately 34,200 g./[$M^2 \times 24$ hr.] as tested by the method described in U.S. Pat. No. 4,862,730 to Crosby and available from W. L. Gore & Associates, Inc. of Newark, DE, was heat sealed to the lip of the cup to create a taut, leakproof, microporous barrier containing the solution.

A similar expanded PTFE membrane was mounted to the surface of a water bath. The water bath assembly was controlled at 23° C. plus or minus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g. and was laced in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The WVTR of the sample was calculated from the weight gain of the cup assembly and was expressed in grams of water per square meter of sample surface area per 24 hours.

LIQUID WATER LEAKAGE

Gloves were tested to determine whether materials and the gloves produced from these materials would be an effective barrier. An effective barrier is defined as the ability of a material to prevent the passage of liquid water under the conditions of this test.

400 ml. of water was carefully poured into a glove through the open wrist portion of the glove. The glove was held in an inverted position so to contain the water. Throughout the duration of the test. The outside surface and the bond line of the glove were observed for one minute or until the presence of water leakage was observed.

If any water leakage from the glove was observed, the glove would receive a fail rating. If no water leakage from the glove was observed during the one minute test period the glove would receive a pass rating.

FORCE-TO-FLEX

The peak force required to flex a sample through a defined geometric bend was measured. The device used was a Thwing-Albert Handle-O-Meter, model 211–5. The Handle-O-Meter has a blade which forces a sample through a 0.64 cm. wide slot having parallel sides to a depth of 0.6 cm.. The peak force required to achieve this deflection is reported in grams.

Samples were die cut into 20.3 cm. squares and allowed to condition in a controlled room at a temperature of 21° C. and a relative humidity of 65%. Samples were placed in a polyethylene bag containing a small amount of talc. The polyethylene bag was lightly shaken to cover the surface of the sample with talc. The excess powder was shaken off. The talc reduces the friction between the sample and the polished surface of the testing device allowing the force-to-flex to be measured independently of the influence of friction.

Each sample was tested in each of its four orientations: machine or cross-machine direction and microporous polymeric membrane up, in contact with the blade or microporous polymeric membrane down, in contact with the slot. If a sample yielded a reading in excess of the 100 g limit on the load cell, the sample size was reduced to a 7.62 cm. square. Results were then adjusted to take the difference in sample size into account, and reported as if full size. The test was repeated from 3 to 5 times for each value reported.

GURLEY NUMBER

The samples were tested for Gurley Number defined in this patent as the time in seconds for 100 cc. of air to flow through 6.45 $cm^2$ of test samples under a pressure drop of 1.2 kPa. The test device, a Gurley Densometer Model 4110, was employed in a method similar to FED-STD-191A Method 5452.

Samples were die cut into 10.2 cm. squares and allowed to condition in a controlled room at a temperature of 21° C. and a relative humidity of 65% for a least 4 hours. The test was repeated 3 to 5 times for each sample tested.

THICKNESS

The thickness of the samples were obtained using ASTM D 1777-64; Standard Method for Measuring Thickness of Textile Materials.

Prior to measurement, the samples were allowed to condition in a controlled room at a temperature of 21° C. and a relative humidity of 65%.

A thickness gauge with a presser foot having a 1.03 cm. diameter was used to measure thickness (Mitutoyo Model 7236). Areas were chosen within the sample that did not contain wrinkles or imperfections to obtain an accurate reading. The presser foot would be caused to contact the sample and after 1 sec. of the application of the full load, the measurement from the dial was taken. Five areas were measured and averaged for each sample thickness given.

CONTAMINATION CONTROL

Gloves were tested to determine their ability to control particle release from the hand of the wearer or from the gloves themselves.

The test was performed in an undisturbed area of a Class 10 clean room to limit the effect of background airborne particle counts.

A plastic 7.5 liter bucket was used as a collection chamber. Two oles were drilled through the side wall of the collection chamber. One hole was used to attach the collection chamber to a tripod. Into the second hole, a length of tubing was fed and attached to a white light particle counter.

The white light particle counter sampled the chamber at a flow rate of 28.3 liter/min. Particles counted using this method were larger than 0.3 micrometers and smaller than 10 micrometers.

For each glove tested, a gloved hand was carefully introduced into the collection chamber and a motion protocol consisting of brushing the thumb against the pads of the fingers followed by a rapid unclenching of the hand producing a flick-like motion was performed. The cycle of the protocol was once a second and was maintained through the use of a metronome. Each gloved hand was measured for one minute at a time alternating from hand to hand, allowing the background counts measured within the chamber to return to zero before performing the next test. This testing was repeated until each glove received 30 minutes ot testing.

If a gloved hand, for any 5 minute period during the test hand an average count of 100 particles 0.3 um or greater, the glove would receive a fail rating. If a gloved hand, for each 5 minute period during the test had an average count of less than 100 particles 0.3 um, the glove would receive a pass rating.

TENSILE PROPERTIES

The tensile properties of the materials were determined using ASTM D 882-83 Method A. A constant rate-of-jaw separation type machine (Instron testing machine, Model 1122) equipped with a strip chart recorder, was used to perform these tests.

Materials were cut using a die into 2.54 cm.×15.24 cm. samples in both the machine and cross machine directions. Samples were allowed to condition in a controlled room at a temperature of 21° C. and 65% relative humidity.

The gauge length of the test was a 7.62 cm., and the strain rate employed was 50.80 cm./min. All samples were tested till break.

Force and strain at break were recorded. Using the initial linear portion of the curve, the modulus of elasticity was determined and the slope of that line was reported as force per unit length. The elastic limit is understood herein as the maximum stress a solid can sustain without permanent deformation. The elastic limit was estimated by obtaining the value of the intersection of the extrapolated lines of the initial linear region of the stress-strain curve and to the linear portion of the stress-strain curve after the yield point.

If the curve did not contain a linear portion after the yield point, then the point of intersection with the initial linear line was determined by the point on that line equivalent to the yield point. If no yield point was found, then the maximum force at break was used.

Force to break, modulus of elasticity and the elastic limit are all reported directly without normalization to the unit area. These values therefore characterize the composite elastomeric fabric.

EXAMPLES

Example 1

This example demonstrates the laminate embodiment of the elastomeric composite fabric and employs the following materials: an elastomeric nonwoven, a microporous polymeric membrane, and a continuous water vapor permeable polymer layer. The elastomeric nonwoven was made from a block copolyether ester. It had a 13 um nominal fiber diameter as determined by photomicrographic examination and is described in U.S. Pat. No. 4,770,398 to Boggs and obtained from Kimberly Clark Corp. in a 1.0 oz./sq. yd. nominal weight. The microporous membrane was a microporous membrane of expanded microporous polytetrafluoroethylene as described in U.S. Pat. No. 3,953,566 to Gore and obtained from W. L. Gore and Assoc., Inc. of Newark, DE. The continous water vapor permeable polymer layer was a polyoxyethylene polyether polyurethane made according to the teachings of U.S. Pat. No. 4,532,316 to Henn.

The elastomeric nonwoven and the microporous polymeric membrane were tested prior to assembly of the elastomeric composite fabric and the results of those tests are found in Table 1, columns 1 and 2.

The elastomeric composite fabric was prepared by a lamination process as shown in FIG. 5. A roll/coater comprising a 0.42 m 4-roll stack configuration, was used. The stock comprised of a gravure roll, quadrangular pattern, 25 cells per linear inch, cell depth of 236 microns (25Q/236), nipped at 538.3 kPa to a silicone rubber roll of 60 shore A durometer, nipped at 358.9 kPa to a chrome roll, nipped at 35.9 kPa to a silicon rubber roll of 60 shore A durometer. The gravure roll was heated to 100°–105° C. The silicone roll nipped to the gravure roll was also at 100°–105° C. The chrome roll was heated to 100°–105° C. while the rubber roll nipped to the chrome roll was at ambient temperature. The gravure roll was in contact with a trough containing the polyurethane in a molten state. The polyurethane was transferred from the gravure roll along the stack until it came in contact with the microporous polymeric membrane. The polyurethane was partially forced into the microporous polymeric membrane. The microporous polymeric membrane into which the polyurethane had been partially forced was combined with the elastomeric nonwoven to form the elastomeric composite fabric. The elastomeric nonwoven was combined with the microporous polymeric membrane with minimal tension while the materials were being fed through the 4-roll stack at a speed of 5.6 meters/min.

The test results of the elastomeric composited fabric can be found in column 3 of Table 1.

The physical testing of the elastomeric nonwoven fabric, the microporous polymeric membrane and the elastomeric composite fabric were performed in two orientations; machine direction which is defined as the direction in which material is produced, and crossmachine direction which is the direction perpendicular to machine direction.

As can be seen in Table 1, the elastomeric composite fabric of the invention is thin, has a low modulus of elasticity, and has a good WVTR. The elastomeric composite fabric is soft and flexible and would permit gloves fabricated from this material to have increased freedom of movement and touch.

TABLE 1

|  | (EXAMPLE 1) | | |
|---|---|---|---|
|  | Elastomeric NonWoven | Microporous Polymeric Membrane | Laminated Elastomeric Composite Fabric |
| WVTR (g/m$^2$/24 hr) | 13,000 | 22,800 | 8300 |
| Thickness (μm) | 152 | 25 | 127 |
| Tensile Properties | | | |
| Machine Direction | | | |
| modulus of elasticity (dyn 1. cm) | 8850 | 24,800 | 67,300 |
| elastic limit (dyn/%) | 11,200/41% | 15,700/25% | 31,500/20% |
| tensile to break (dyn) | 31,500 | 38,200 | 117,000 |
| elongation to break (%) | 493% | 243% | 372% |
| Cross Machine Direction | | | |
| modulus of elasticity (dyn 1. cm) | 6200 | 154,000 | 122,000 |
| elastic limit (dyn/%) | 6740/41% | 101,000/26% | 115,000/36% |
| tensile to break (dyn) | 18,000 | 101,000 | 115,000 |
| elongation to break (%) | 496% | 79% | 69% |
| Force-To-Flex | | | |
| Machine Direction | | | |
| up (gm/20.3 cm) | 3.3 | 2.0 | 8.7 |
| down (gm/20.3 cm) | 2.9 | 1.2 | 10.0 |
| Cross Machine Direction | | | |
| up (gm/20.3 cm) | 3.0 | 1.7 | 9.5 |
| down (gm/20.3 cm) | 2.3 | 1.4 | 11.4 |

Example 2

Example 2 describes a glove manufactured from the elastomeric composite fabric of Example 1. Two layers of the elastomeric composite fabric were positioned such that the microporous polymeric membrane layer is the outer layer and the elastomeric nonwoven layer is the inner layer, and thus in contact with the other layer of elastomeric nonwoven. The two layers of elastomeric composite fabric were smoothed to remove any wrinkles in the material and were carefully affixed with pressure sensitive tape to a sheet of heavy cardboard to maintain the orientation of the layers and the smoothness of the material when subjected to the simultaneous cutting heat sealing step.

The two layers of elastomeric composite fabric were then placed in a heated press on which a sharpened die was attached. The die was heated to a temperature of about 250° C. The die was pressed onto the two layers of elastomeric composite fabric for 5 seconds with sufficient pressure to simultaneously cut the periphery of the glove and heat seal the two layers of elastomeric composite fabric creating a continuous thin elastomeric seam.

The gloves produced from this process were tested to determine their ability to control contamination. The gloves received a pass rating.

The gloves produced from this process were subjected to the Liquid Water Leakage Test, to determine the integrity of the elastomeric composite fabric and the continous thin elastomeric seam. The gloves received a pass rating.

Example 3

Example 3 illustrates the preparation of the coated product elastomeric composite fabric of the invention. The elastomeric nonwoven and the polyurethane that forms the continous water vapor permeable polymer layer are identical to those found in Example 1.

The preparation of the coated elastomeric composite fabric was carried out using the coating process depicted in FIG. 6. A roll coater was used consisting of a 4-roll stack configuration. The roll coater consisted of a gravure roll, quadrangular pattern, 25 cells per linear inch, cell depth 236 microns (25Q/236), nipped at 538.3 kPa to a silicone rubber roll of 60 shore A durometer, nipped at 35.9 kPa to a chrome roll, nipped at 35.9 kPa to a silicone rubber roll of 60 shore A durometer. The gravure roll was heated to 100°–105° C. The silicone roll nipped to the gravure roll was also heated to a temperature of 100°–105° C. The chrome roll was heated to 100°–105° C. while the rubber roll nipped to the chrome roll was at ambient temperature. The gravure roll was in contact with a trough containing the polyurethane in a molten state. The polyurethane melt was transferred from the gravure roll along the stack until it came in contact with a microporous polymeric membrane. The microporous polymeric membrane was expanded microporous polytetrafluoroethylene of a thickness less than 25 μm inches. This membrane functions as a scaffold for the molten polyurethane. The polyurethane was forced into the scaffold. The coating (combination of scaffold and polyurethane) was combined with the elastomeric nonwoven to form the coated elastomeric composite fabric. The elastomeric nonwoven was combined with the coating material under minimal tension. The materials were fed through the 4-roll stack at a speed of about 5 meters/min.

The test results for the elastomeric nonwoven and the coated product elastomeric composite fabric can be found in Table 2.

As can be seen in Table 2, the coated elastomeric composite fabric of the invention is thin and has a low modulus of elasticity The elastomeric composite fabric is soft and flexible and would permit gloves fabricated from this material to have increased freedom of movement and touch. The WVTR was high.

TABLE 2

|  | (EXAMPLE 3) | |
|---|---|---|
|  | Elastomeric NonWoven | Coated Elastomeric Composite Fabric |
| WVTR (g/m$^2$/24 hr) | 13,000 | 11,100 |
| Thickness (μm) | 152 | 127 |
| Tensile Properties | | |
| Machine Direction | | |
| modulus of elasticity (dyn 1. cm) | 8850 | 42,500 |
| elastic limit (dyn/%) | 11,200/41% | 108,000% |
| tensile to break (dyn) | 31,500 | 36,00 |
| elongation to break (%) | 493% | 109% |
| Cross Machine Direction | | |
| modulus of elasticity (dyn 1. cm) | 6200 | 17,700 |
| elastic limit (dyn/%) | 6740% | 13,500/30% |
| tensile to break (dyn) | 18,000 | 24,700 |
| elongation to break (%) | 496% | 148% |
| Force-To-Flex Resistance | | |

TABLE 2-continued
(EXAMPLE 3)

|  | Elastomeric NonWoven | Coated Elastomeric Composite Fabric |
|---|---|---|
| Machine Direction |  |  |
| up (gm/20.3 cm) | 3.3 | 5.8 |
| down (gm/20.3 cm) | 2.9 | 7.5 |
| Cross Machine Direction |  |  |
| up (gm/20.3 cm) | 3.0 | 6.5 |
| down (gm/20.3 cm) | 2.3 | 7.9 |

Example 4

Example 4 describes a glove manufactured from the coated product elastomeric composite fabric of Example 3. Gloves were produced using the process as described in Example 2.

The gloves produced from this process were tested to determine their ability to control contamination. The gloves received a pass rating.

The gloves produced from this process were subjected to the Liquid Water Leakage Test, to determine the integrity of the coated product elastomeric composite fabric and the continuous thin elastomeric seam. The gloves received a pass rating.

Comparative Example 1

Comparative Example 1 characterizes a commercially produced glove and its fabric laminate (available from W. L. Gore & Associates, Inc.). This fabric laminate consists of a membrane of continuous hydrophilic polyurethane, hydrophobic microporous expanded polytetrafluoroethylene such as taught in U.S. Pat. No. 4,194,041 to Gore/Allen laminated to a nylon/spandex tricot knit (82% Antron ® nylon 6,6/18% Lycra ®; 5.4–5.9 oz./yd.$^2$). The fibers of the nylon are not elastomeric. The knit has stretch characteristics by virtue of the structure of the knit and its spandex fiber content. Table 3 contains the test results of the membrane and said knit as well as the fabric laminate produced from the lamination of these two elements.

The data presented indicates, as seen in practice, that the amount of touch or feeling that a wearer can experience while wearing gloves fabricated from this material is greatly limited when compared to gloves fabricated from the elastomeric composite fabrics of the invention.

The fabric laminate shows noticeable gathering on the PTFE surface. The materials employed and the gathering result in a fabric laminate with a thickness of about 600 μm. Furthermore, this gathering occurs predominately in one orientation producing a fabric laminate with a ribbed appearance containing many tube-like structures. Perpendicular to this orientation, the fabric laminate requires a high force to flex.

Gloves are fabricated from the fabric laminate of Comparative Example 1 by cutting out of the fabric pattern pieces. These pieces were subsequently sewn into glove form. These gloves were tested for integrity using the Liquid Water Leakage test and failed. Gloves also failed the Contamination Control Test.

As can be seen in Table 3, comparative elastomeric composite fabrics 1 is thicker than the elastomeric composite fabrics of the invention. Comparative elastomeric composite fabric 1 also has a higher modulus of elasticity and a much higher flex value, which when fabricated into a glove results in a glove with poor dexterity and touch.

TABLE 3
(COMPARATIVE EXAMPLE 1)

|  | Knit | Membrane | Laminate |
|---|---|---|---|
| WVTR (g/m$^2$/24 hr) | 22800 | 5740 | 4890 |
| Thickness (μm) | 457 | 25 | 559 |
| Tensile Properties |  |  |  |
| Machine Direction |  |  |  |
| modulus of elasticity (dyn 1. cm) | 9740 | 24,800 | 10,600 |
| elastic limit (dyn/%) | 6740/23% | 15,700/25% | 13,500/56% |
| tensile to break (dyn) | 515,000 | 38,200 | 459,000 |
| elongation to break (%) | 430% | 243% | 347% |
| Cross Machine Direction |  |  |  |
| modulus of elasticity (dyn 1. cm) | 43,400 | 154,000 | 394,000 |
| elastic limit (dyn/%) | 71,900/68% | 101,000/26% | 234,000/23% |
| tensile to break (dyn) | 1,420,000 | 101,000 | 60,000 |
| elongation to break (%) | 180% | 79% | 139% |
| Force-To-Flex Resistance |  |  |  |
| Machine Direction |  |  |  |
| up (measured 7.6 cm × 7.6 cm sam.) |  |  | 13 |
| up (gm/20.3) | 22.2 | 2.0 | 36.0 |
| down (measured 7.6 cm × 7.6 cm) |  |  | 10.1 |
| down (gm/20.3) | 16.1 | 1.2 | 27.0 |
| Cross Machine Direction |  |  |  |
| up (measured 7.6 cm × 7.6 cm sam.) |  |  | 56.2 |
| up (gm/20.3) | 24.7 | 1.7 | 150.1 |
| down (measured 7.6 cm × 7.6 cm) |  |  | 95.8 |
| down (gm/20.3) | 24.0 | 1.4 | 255.8 |

Comparative Example 2

Comparative Example 2 describes a fabric laminate taught in U.S. Pat. No. 4,443,511 to Worden.

A microporous polymeric membrane of microporous expanded polytetrafluoroethylene was combined with a water vapor permeable polymer layer consisting of a polyurethane formed from a polyoxyethylene prepolymer. The polyurethane is allowed to partially penetrate into the microporous polymeric membrane to obtain a coated membrane.

The coated membrane was subsequently fed through lamination equipment consisting of a gravure roll which printed onto its surface a impermeable polyruethane adhesive. The coated membrane was combined with a spandex contouring knit fabric in a nipping procedure. This procedure was accomplished with a minimum of tension.

Following the teachings of Worden, the laminate fabric was stretched 10% in the cross machine direction through the use of a pin tenter frame. The laminate fabric was stretched in the machine direction by feeding the laminate fabric through two pair of nipped rolls spaced 56 cm. apart. The first pair of rollers was driven at a speed of 1.5 m. per minute. The second pair of rollers was driven at 3.0 m. and 4.5 m. per minute thereby producing laminate fabric that had been stretched 100% and 200% respectively.

The results of the test fabric laminate are shown in Table 4.

As can be seen in Table 4, fabric laminate 2 is thicker than the fabrics of the invention. Fabric laminate 2 also has higher flex values which if fabricated into a glove, would result in a glove with poor dexterity and touch.

The fabric laminate taught in Worden utilizes discrete dots of a non-water Vapor-permeable polymer to produce the laminate structure. The elastomeric composite fabric disclosed herein does not contain discrete dots of non-water vapor-permeable polymer rather it contains a water vapor-permeable polymer which contacts the membrane and the elastomeric nonwoven web to form the composite fabric.

ester having substantially continuous elastomeric filaments Elatomeric nonwovens of copolyether ester are taught in U.S. Pat. No. 4,770,398 to Boggs and were obtained from Kimberly Clark Corp. Three different weights of the elastomeric nonwoven were used; 0.5 oz./yd², 1.0 oz./yd², and 1.5 oz./yd².

Another family of elastomeric nonwovens used were elastomeric nonwoven consisting of polyurethane fibers as taught in U.S. Pat. No. 4,660,228 to Ogawa and available from Kanebo. Two variations of the polyurethane

TABLE 4

(COMPARATIVE EXAMPLE 2)

|  | Knit | Membrane | Laminate (unstretched) | Laminate (machine 100% cross-machine 10%) | Laminate (machine 200% cross-machine 10%) |
|---|---|---|---|---|---|
| WVTR (g/m²/24/hr) | 10600 | 15000 | 6590 | 5630 | 5860 |
| Thickness (μm) | 254 | 25 | 279 | 279 | 330 |
| Tensile Properties |  |  |  |  |  |
| Machine Direction |  |  |  |  |  |
| modulus of elasticity (dyn 1. cm) | 4430 | 47,800 | 63,700 | 26,600 | 14,200 |
| elastic limit (dyn/%) | 2250/35% | 20,200/16% | 27,000/17% | 54,000/81% | 27,000/77% |
| tensile to break (dyn) | 218,000 | 56,200 | 256,000 | 241,000 | 272,000 |
| elongation to break (%) | 346% | 209% | 338% | 301% | 285% |
| Cross Machine Direction |  |  |  |  |  |
| modulus of elasticity (dyn 1. cm) | 25,700 | 107,000 | 155,000 | 112,000 | 92,100 |
| elastic limit (dyn/%) | 27,000/41% | 94,400/47% | 396,000/102% | 303,000/107% | 265,000/111% |
| tensile to break (dyn) | 438,000 | 94,400 | 396,000 | 414,000 | 398,000 |
| elongation to break (%) | 161% | 54% | 126% | 149% | 165% |
| Force-To-Flex Resistance |  |  |  |  |  |
| Machine Direction |  |  |  |  |  |
| up (gm/20.3) | 4.9 | 4.2 | 22.2 | 23.2 | 26.3 |
| down (gm/20.3) | 3.7 | 4.9 | 26.6 | 24.8 | 26.4 |
| Cross Machine Direction |  |  |  |  |  |
| up (gm/20.3) | 13.6 | 5.5 | 53.8 | 53.5 | 50.1 |
| down (gm/20/3) | 13.3 | 5.6 | 79.0 | 56.1 | 55.9 |

Example 5

Example 5 demonstrates the use of various elastomeric nonwoven materials comprising the elastomeric nonwoven of the elastomeric composite fabric of this invention.

One family of elastomeric nonwovens used were elastomeric nonwovens of copolymers of copolyether ester having substantially continuous elastomeric filaments were obtained from Kanebo, designated "hard" and "soft". The polyurethane nonwovens were obtained over a weight range of 0.75 oz./yd² and 2.25 oz./yd² weights.

Elastomeric composite fabrics of this invention were made with this range of elastmeric nonwoven as taught in Example 1 and Example 3. The test data is presented in Table V.

TABLE 5

(EXAMPLE 5)

|  | Kimberly Clark 0.5 oz./yd² | | | Kimberly Clark 1.0 oz./yd² | | |
|---|---|---|---|---|---|---|
|  | NonWoven | Laminated Elastomeric Composite Fabric | Coated Elastomeric Composite Fabric | Non-Woven | Laminated Elastomeric Composite Fabric | Coated Elastomeric Composite Fabric |
| WVTR (g/m²/24 hr) | 16200 | 6960 | 7790 | 13000 | 8300 | 11100 |
| Thickness (μm) | 102 | 102 | 127 | 152 | 127 | 127 |
| Tensile Properties |  |  |  |  |  |  |
| Machine Direction |  |  |  |  |  |  |
| modulus of elasticity (dyn 1. cm) | 2660 | 38,900 | 26,600 | 8850 | 67,300 | 42,500 |
| elastic limit (dyn/%) | 2560/56% | 31,500/33% | 9440/10% | 11,200/41% | 31,500/20% | 36,000/31% |
| tensile to break (dyn) | 8990 | 96,700 | 56,200 | 31,500 | 117,000 | 36,000 |
| elongation to break (%) | 446% | 365% | 123% | 493% | 372% | 109% |
| Cross Machine Direction |  |  |  |  |  |  |
| modulus of elasticity (dyn 1. cm) | 4430 | 51,300 | 12,400 | 6200 | 122,000 | 17,700 |
| elastic limit (dyn/%) | 2560/41% | 65,200/46% | 13,500/45% | 6740/41% | 115,000/36% | 13,500/30% |
| tensile to break (dyn) | 13,500 | 65,200 | 31,500 | 18,000 | 115,000 | 24,700 |
| elongation to break (%) | 442% | 73% | 220% | 496% | 69% | 148% |
| Force-To-Flex Resistance |  |  |  |  |  |  |
| Machine Direction |  |  |  |  |  |  |
| up (gm/20.3) | 2.1 | 7.3 | 6.1 | 3.3 | 8.7 | 5.8 |
| down (gm/20.3) | 2.5 | 7.1 | 5.2 | 2.9 | 10.0 | 7.5 |
| Cross Machine Direction |  |  |  |  |  |  |
| up (gm/20.3) | 1.8 | 21.7 | 6.4 | 3.0 | 9.5 | 6.5 |
| down (gm/20.3) | 2.6 | 27.4 | 6.9 | 2.3 | 11.4 | 7.9 |

TABLE 5-continued
(EXAMPLE 5)

| | | | | | | |
|---|---|---|---|---|---|---|
| Gurley (sec) | | | | | | |
| low (gm/20.3) | .008 | >600 | 233 | 0.015 | >600 | 71.2 |
| x (gm/20.3) | .088 | >600 | 320 | 0.017 | >600 | 124.0 |

| | Kimberly Clark 1.5 oz./yd² | | | Kanebo Hard 0.75 oz./yd² | | |
|---|---|---|---|---|---|---|
| | Non-Woven | Laminated Elastomeric Composite Fabric | Coated Elastomeric Composite Fabric | Non-Woven | Laminated Elastomeric Composite Fabric | Coated Elastomeric Composite Fabric |
| WVTR (g/m²/24 hr) | 10800 | 8300 | 9300 | 14300 | 10300 | 8400 |
| Thickness (μm) | 178 | 178 | 178 | 127 | 127 | 152 |
| Tensile Properties | | | | | | |
| *Machine Direction* | | | | | | |
| modulus of elasticity (dyn 1. cm) | 23,000 | 63,700 | 54,000 | 7970 | 114,000 | 67,300 |
| elastic limit (dyn/%) | 15,700/26% | 38,200/25% | 47,200/35% | 6740/29% | 40,500/14% | 51,700/34% |
| tensile to break (dyn) | 56,200 | 112,000 | 157,000 | 20,200 | 112,000 | 51,700 |
| elongation to break (%) | 512% | 420% | 387% | 298% | 278% | 145% |
| *Cross Machine Direction* | | | | | | |
| modulus of elasticity (dyn 1. cm) | 15,000 | 112,000 | 28,300 | 7970 | 62,800 | 15,900 |
| elastic limit (dyn/%) | 11,200/30% | 115,000/40% | 22,500/33% | 6740/30% | 101,000/65% | 15,700/35% |
| tensile to break (dyn) | 45,000 | 15,000 | 47,200 | 24,700 | 101,000 | 42,700 |
| elongation to break (%) | 541% | 89% | 286% | 348% | 84% | 295% |
| Fore-To-Flex Resistance | | | | | | |
| *Machine Direction* | | | | | | |
| up (gm/20.3) | 8.3 | 19.9 | 11.0 | 2.4 | 10.0 | 5.8 |
| down (gm/20.3) | 8.4 | 23.2 | 15. | 1.9 | 10.8 | 5.6 |
| *Cross Machine Direction* | | | | | | |
| up (gm/20.3) | 5.3 | 19.3 | 12.5 | 2.0 | 7.6 | 6.0 |
| down (gm/20.3) | 5.7 | 16.1 | 12.5 | 1.9 | 7.9 | 6.2 |
| Gurley | | | | | | |
| low (gm/20.3) | 0.025 | >600 | 65.7 | 0.005 | >600 | 31.7 |
| x (gm/20.3) | 0.030 | >600 | 102 | 0.005 | >600 | 299 |

| | Kanebo Soft 0.75 oz./yd² | | |
|---|---|---|---|
| | Non-Woven | Laminated Elastomeric Composite Fabric | Coated Elastomeric Composite Fabric |
| WVTR (g//m²/24 hr) | 16500 | 11400 | 99300 |
| Thickness (μm) | 102 | 127 | 127 |
| Tensile Properties | | | |
| *Machine Direction* | | | |
| modulus of elasticity (dyn 1. cm) | 4430 | 82,300 | 54,000 |
| elastic limit (dyn/%) | 4500/39% | 31,500/14% | 38,200/30% |
| tensile to break (dyn) | 22,500 | 92,200 | 38,200 |
| elongation to break (%) | 451% | 283% | 227% |
| *Cross Machine Direction* | | | |
| modulus of elasticity (dyn 1. cm) | 6200 | 52,200 | 17,700 |
| elastic limit (dyn/%) | 4500/33% | 89,900/70% | 18,000/39% |
| tensile to break (dyn) | 29,200 | 124,000 | 45,000 |
| elongation to break (%) | 468% | 92% | 365% |
| Flex Resistance | | | |
| *Machine Direction* | | | |
| up (gm/20.3) | 2.3 | 6.7 | 4.9 |
| down (gm/20.3) | 1.9 | 7.3 | 4.0 |
| *Cross Machine Direction* | | | |
| up (gm/20.3) | 1.9 | 9.6 | 6.7 |
| down (gm/20.3) | 1.9 | 8.7 | 4.5 |
| Gurley | | | |
| low (gm/20.3) | 0.003 | >600 | 199 |
| x (gm/20.3) | 0.003 | >600 | 485 |

| | Kanebo Soft 2.25 oz./yd² | | |
|---|---|---|---|
| | Non-Woven | Laminated Elastomeric Composite Fabric | Coated Elastomeric Composite Fabric |
| WVTR (g/m²/24 hr) | 9600 | 7200 | 7900 |
| Thickness (μm) | 254 | 229 | 254 |
| Tensile Properties | | | |
| *Machine Direction* | | | |
| modulus of elasticity (dyn 1 cm) | 16,800 | 70,800 | 38,900 |
| elastic limit (dyn/%) | 11,200/24% | 47,200/26% | 15,700/16% |
| tensile to break (%) | 470% | 402% | 434% |
| elongation to break (%) | 470% | 402% | 434% |
| *Cross Machine Direction* | | | |
| modulus of elasticity (dyn 1 cm) | 22,100 | 66,300 | 31,000 |
| elastic limit (dyn/%) | 13,500/26% | 121,000/71% | 24,700/31% |
| tensile to break (dyn) | 108,000 | 121,000 | 126,000 |

TABLE 5-continued (EXAMPLE 5)

| | | | |
|---|---|---|---|
| elongation to break (%) | 498% | 97% | 453% |
| Force-To-Flex Resistance | | | |
| Machine Direction | | | |
| up (gm/20.3) | 12.8 | 22.4 | 20.9 |
| down (gm/20.3) | 11.9 | 28.4 | 18.8 |
| Cross Machine Direction | | | |
| up (gm/20.3) | 16.2 | 34.2 | 25.7 |
| down (gm/20.3) | 16.3 | 37.0 | 23.5 |
| Gurley | | | |
| low (gm/20.3) | 0.013 | >600 | 41.1 |
| x (gm/20.3) | 0.015 | >600 | 67.1 |

Example 6

Example 6 demonstrates a different combination of materials and the use of another water vapor permeable polymer in the elastomeric composite fabric of the invention.

Example 6A describes an elastomeric composite fabric where the continuous water vapor permeable polymer is a polyurethane made according to the teachings of PCT 90-00180 to Sakhpara. The microporous polymeric membrane was coated with the polyurethane.

The polyurethane coated microporous polymeric membrane was subsequently processed by the lamination process taught in Example 1.

Example 6B describes the elastomeric composite fabric of Example 1 and is offered for comparative purposes. The test results of Examples 6A and 6B can be found in Table 6.

TABLE 6

(EXAMPLE 6)

| | 6A | 6B |
|---|---|---|
| WVTR (g/m²/24 hr) | 8400 | 8300 |
| Thickness (μm) | 152 | 127 |
| Tensile Properties | | |
| Machine Direction | | |
| modulus of elasticity (dyn 1 cm) | 106,000 | 67,300 |
| elastic limit (dyn/%) | 45,000/17% | 31,500/20% |
| tensile to break (dyn) | 126,000 | 117,000 |
| elongation to break (%) | 350% | 372% |
| Cross Machine Direction | | |
| modulus of elasticity (dyn 1 cm) | 278,000 | 122,000 |
| elastic limit (dyn/%) | 135,000/18% | 115,000/36% |
| tensile to break (dyn) | 135,000 | 115,000 |
| elongation to break (%) | 61% | 69% |
| Force-To-Flex Resistance | | |
| Machine Direction | | |
| up (gm/20.3) | 20.2 | 8.7 |
| down (gm/20.3) | 23.6 | 10.0 |
| Cross Machine Direction | | |
| up (gm/20.3) | 20.8 | 9.5 |
| down (gm/20.3) | 22.6 | 11.4 |

Example 7

Example 7 demonstrates the use of another microporous polymeric membrane in the elastomeric composite fabric. A microporous polyurethane membrane identified as Porelle 30, available from Porvair, Ltd., United Kingdom was employed as the microporous polymeric layer. Produced using process described in Example 1.

The test results of Example 7 are found in Table 7.

TABLE 7

(EXAMPLE 7)

| | Elastomeric Non-Woven | Porelle 30 | Elastomeric Composite Fabric |
|---|---|---|---|
| WVTR (g/m²/24 hr) | 13000 | 2500 | 1900 |
| Thickness (μm) | 152 | 51 | 203 |
| Tensile Properties | | | |
| Machine Direction | | | |
| modulus of elasticity (dyn 1. cm) | 8850 | 100,000 | 93,800 |
| elastic limit (dyn/%) | 11,200/41% | 15,700/8% | 33,700/14% |
| tensile to break (dyn) | 31,500 | 42,700 | 106,000 |
| elongation to break (%) | 493% | 224% | 307% |
| Cross Machine Direction | | | |
| modulus of elasticity (dyn 1. cm) | 6200 | 111,000 | 69,900 |
| elastic limit (dyn/%) | 6740/41% | 15,700/5% | 22,500/13% |
| tensile to break (dyn) | 18,000 | 42,700 | 69,700 |
| elongation to break (%) | 496% | 255% | 268% |
| Force-To-Flex Resistance | | | |
| Machine Direction | | | |
| up (gm/20.3) | 3.3 | 3.6 | 34.0 |
| down (gm/20.3) | 2.9 | 3.5 | 33.6 |
| Cross Machine Direction | | | |
| up (gm/20.3) | 3.0 | 3.4 | 32.2 |
| down (gm/20.3) | 2.3 | 3.3 | 28.0 |

Example 8

Example 8 demonstrates the combining of the elastomeric nonwoven layer with the microporous polymeric layer in a stretched condition to form the elastomeric composite fabric of the invention. The product of Example 8A is elastomeric composite produced as in fabric of Example 1. Example 8A was produced with a minimal amount of differential stretch introduced into the elastomeric nonwoven layer when combined with the microporous polymeric layer. In Example 8B, the elastomeric nonwoven was fed into the nip at a rate approximately 50% of the rate at which the polymeric membrane of 8A was being fed through the nip. Other than this differential stretch, the other process conditions were the same as described in Example 1.

Example 8A s a control sample produced at the same time as Example 8B.

The product of Example 8B is an elastomeric composite fabric within the teachings of the invention and did not exhibit gathering on a macroscopic scale but had a relatively smooth surface (similar to the product of Example 8A), even though the product of 8B had been combined in a differential stretch condition.

The test results for Example 8 can be seen on Table 8.

TABLE 8
(EXAMPLE 8)

| | 8A | 8B |
|---|---|---|
| WVTR (g/m²/24 hr) | 8700 | 8000 |
| Thickness (μm) | 152 | 178 |
| Tensile Properties | | |
| Machine Direction | | |
| modulus of elasticity (dyn 1. cm) | 86,700 | 43,400 |
| elastic limit (dyn/%) | 36,000/16% | 42,700/37% |
| tensile to break (dyn) | 110,000 | 128,000 |
| elongation to break (%) | 344% | 404% |
| Cross Machine Direction | | |
| modulus of elasticity (dyn 1. cm) | 74,300 | 71,700 |
| elastic limit (dyn/%) | 20,200/12% | 24,700/12% |
| tensile to break (dyn) | 121,000 | 133,000 |
| elongation to break (%) | 81% | 79% |
| Force-To-Flex Resistance | | |
| Machine Direction | | |
| up (gm/20.3) | 13.4 | 13.8 |
| down (gm/20.3) | 15.5 | 14.5 |
| Cross Machine Direction | | |
| up (gm/20.3) | 11.5 | 10.2 |
| down (gm/20.3) | 10.7 | 12.2 |

We claim:

1. An elastomeric composite fabric which is substantially planar and which comprises in a layered arrangement:
   (i) a microporous polymeric membrane
   (ii) a water vapor-permeable polymer and
   (iii) an elastomeric thermoplastic fibrous nonwoven web in which the fibers are elastomeric and are less than 50 micron in diameter,
   said polymer (ii) being continous and being in contact with membrane (i) and substrate (iii),
   said composite fabric exhibiting an elastic modulus in at least one direction less than 15 pli, an overall thickness less than about 15 mils, and having a force to flex less than 35 grams in any direction;
   said composite fabric being liquid water-impermeable,
   said composite fabric having a water vapor transmission rate of at least about 5000 gm.m²/24 hrs.

2. A composite fabric of claim 1 wherein polymer layer (ii) is present substantially as a layer between layers (i) and (iii).

3. A composite fabric of claim 1 wherein polymer layer (ii) is present substantially in the pores of microporous polymeric membrane (i).

4. A composite fabric of claim 1 wherein the microporous polymeric membrane has a microscopic structure of open, interconnecting voids.

5. A composite fabric of claim 4 wherein the microporous polymeric membrane is a plastic polymer or an elastomeric polymer.

6. A composite fabric of claim 4 wherein the microporous polymeric membrane is a plastic polymer selected from the class consisting of polytetrafluoroethylene, polypropylene, polyethylene, polyesters, polyamides, polyacrylates.

7. A composite fabric of claim 4 wherein the microporous polymeric membrane is an elastomeric polymer selected from the class consisting of polyurethanes, copolyether esters and copolyether amides.

8. A composite fabric of claim 1 wherein the continuous water vapor-permeable polymer is a hydrophilic polyurethane.

9. A composite fabric of claim 8 wherein the hydrophilic polyurethane is a poly (oxyethylene) polyurethane.

10. A composite fabric of claim 1 wherein the thermoplastic elastomeric nonwoven web comprises a coherent nonwoven matrix of elastic fiber of a block copolymer.

11. The composite fabric of claim 10 where the block copolymer is a polyetherester.

12. A composite fabric of claim 10 wherein the polyetherester has the formula

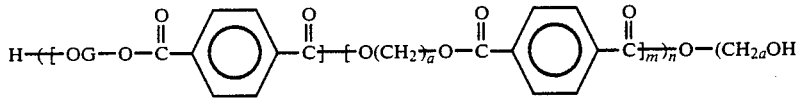

where
"G" is selected from the group including poly(oxyethylene)-alpha, omega-diol poly(oxpropylene)-alpha, omege-diol, or poly(oxytetramethylene)-alpha, omega-diol and "m", "n" and "a" are positive integers.

13. The composite fabric of claim 10 the block copolymer is a polyurethane.

14. A form fitting article which comprises two superimposed layers of the fabric of claim 1, said two layers being Joined together along the periphery thereof to form a configuration corresponding to the contour of a desired article, leaving an unjoined opening portion.

15. The article of claim 14 wherein the nonwoven web side of each layer is adjacent to one another.

16. The article of claim 14 wherein the microporous polymeric membrane side of each layer is adjacent to one another.

17. The article of claim 15 in the form of a glove or mitten.

18. The article of claim 16 in the form of a glove or mitten.

* * * * *